Patented Feb. 17, 1953

2,628,955

UNITED STATES PATENT OFFICE 2,628,955

OLEFINIC INTERPOLYMERS AND METHOD OF MAKING SAME

Charles I. Parrish, Stow, Ohio, assignor to The B. F. Goodrich Company, New York, N. Y., a corporation of New York No Drawing. Application June 8, 1950, Serial No. 166,979

8 Claims. (Cl. 260—80.7)

This invention relates to novel interpolymers of an olefin and a fulvene and to a method of producing the same, and is especially concerned with the preparation of solid, high molecular weight, tough, plastic and elastic, rubbery interpolymers from monomeric mixtures containing an isoolefin and a substituted fulvene, together, if desired, with a conjugated diolefin such as isoprene.

It has been disclosed in U. S. Patents 2,356,128, 2,356,129 and 2,356,130 that solid, high molecular weight, rubbery copolymers may be made from monomeric mixtures comprising a major proportion of an isoolefin such as isobutene (isobutylene) and a minor proportion of a conjugated diolefin such as butadiene-1,3, isoprene, or dimethyl butadiene-1,3, by a low temperature polymerization reaction utilizing a Friedel-Crafts type catalyst such as aluminum trichloride dissolved in a low-freezing solvent such as ethyl chloride. Such copolymers are known to the art as "Butyl" or "GR-I" synthetic rubber. These rubbery copolymers are capable of being vulcanized, that is, of being converted from an essentially plastic condition to an essentially elastic condition by heating with sulfur in the presence of a vulcanization accelerator or with any of several other vulcanizing agents.

Although such isoolefin diolefin copolymers are quite useful in the final vulcanized condition, they possess in both the vulcanized and unvulcanized condition several distinct and serious disadvantages. The modulus of elasticity of their vulcanizates is often undesirably low. In addition, they are soft and weak in the unvulcanized raw state such that "cold flow" occurs making it difficult to handle them as in storage and shipment, yet when they are processed and compounded in the rubber factory, they are tough, "nervy," difficult to form into a smooth sheet on the mill and not readily admixed with compounding ingredients.

I have now discovered that compounds of the class known as fulvenes are copolymerizable at low temperatures in presence of a Friedel-Crafts type catalyst with olefins which polymerize under such conditions, particularly the isomonoolefins such as isobutylene, to produce high molecular weight interpolymers of outstanding properties. For example, I have found that interpolymers of a major proportion of isobutylene with a minor proportion of a fulvene or with minor proportions of both a fulvene and a conjugated diolefin are solid, high molecular weight plastic rubbery materials which are vulcanizable to produce strong elastic vulcanizates and in addition possess outstanding raw polymer properties in that they are firm and resist cold flow in the raw unvulcanized state yet may be easily masticated and milled into smooth sheets and will readily absorb the usual compounding ingredients during milling operations.

A fulvene which I prefer to copolymerize with olefins in accordance with this invention is 6,6-dimethyl fulvene (which may also be named 5-propylidene-cyclopentadiene-1,3) an intensely colored compound which has the following structure:

and is conveniently made by the condensation of cyclopentadiene with acetone in the presence of an alkali such as sodium hydroxide.

The above structural formula of 6,6-dimethyl fulvene suggests that its polymerization might involve the double bonds of the cyclopentadiene nucleus and also the external (5,6-) double bond. However, it appears that the external double bond is largely if not entirely responsible for its interpolymerization with olefins. Consequently the interpolymers contain cyclopentadiene rings

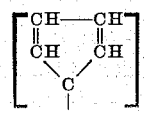

spaced in more or less regular fashion along the polymer chains. The unsaturation of the cyclopentadiene groups thus is undisturbed and is available to react with sulfur or other vulcanization agent during vulcanization to produce strong elastic vulcanized compositions.

Other fulvenes of a nature similar to 6,6-dimethyl fulvene likewise produce interpolymers according to this invention. Thus there may be used any fulvene hydrocarbon, that is, a compound of the structure

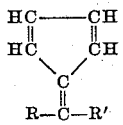

wherein R and R' are hydrogen or hydrocarbon radicals, or R and R' together represent a bivalent hydrocarbon radical, regardless of whether the hydrocarbon radicals are saturated or unsaturated and regardless of whether they are aliphatic (as in the case of alkyl and alkenyl radicals) or cyclic (as in the case of aryl and cycloalkyl radicals) or both (as in the case of aralkyl and alkaryl radicals). Illustrative fulvene hydrocarbons, in addition to the parent fulvene and 6,6-dimethyl fulvene, are 6-methyl fulvene, 6-ethyl fulvene, 6-methyl 6-ethyl fulvene, 6-methyl 6-vinyl fulvene, 6,6-diethyl fulvene, 6-methyl 6-isopropyl fulvene, 6-methyl-6-isobutenyl fulvene, 6-ethyl 6-isopropyl fulvene, 6-methyl 6-isopropenyl fulvene, 6-butyl fulvene, 6-methyl 6-isobutyl fulvene, 6,6-diisopropyl fulvene, 6-methyl 6-n-heptyl fulvene, 6-ethyl 6-n-pentyl fulvene, 6-methyl-6-cyclohexyl fulvene, 6,6-dicyclohexyl fulvene, 6-methyl-6-phenyl fulvene, 6-methyl-6-benzyl fulvene, 6-phenyl fulvene, 6,6-diphenyl fulvene, 6-phenyl 6-o-tolyl fulvene, 6-naphthyl fulvene, 6,6-dicumyl fulvene, 6,6-pentamethylene fulvene and others. These fulvenes can be produced in a manner analogous to that disclosed above in connection with 6,6-dimethyl fulvene, that is, by the condensation of cyclopentadiene with the appropriate aldehyde or ketone. Fulvene hydrocarbons containing a total of 6 to 18 carbon atoms, particularly the 6-alkyl and 6,6-dialkyl fulvenes are the preferred fulvene hydrocarbons.

In addition, there may also be used in this invention other fulvenes in which the substituent in the 6-position contains elements other than carbon and hydrogen, such as halogen atoms, oxygen atoms as in hydroxy, alkoxy or carboxy groups and nitrogen atoms as in amino groups. Examples of such fulvenes include 6-methyl 6-chloromethyl fulvene (from cyclopentadiene and chloroacetone), 6-methyl 6-bromomethyl fulvene (from cyclopentadiene and bromoacetone), 6-phenyl 6-bromomethyl fulvene (from cyclopentadiene and bromo-acetophenone), 6-methyl 6-[2-methyl-2-hydroxy-propyl] fulvene (from cyclopentadiene and diacetone alcohol), 6-[2-hydroxy-propyl] fulvene (from cyclopentadiene and aldol), 6-methyl 6-hydroxymethyl fulvene (from cyclopentadiene and acetol), 6-methyl 6-carboxy fulvene (from cyclopentadiene and pyruvic acid), 6-methyl 6-carboethoxymethyl fulvene (from cyclopentadiene and ethyl acetoacetate), and 6-methyl 6-[2-amino-3-methyl-propyl] fulvene (from cyclopentadiene and diacetone amine). The use of fulvenes containing reactive groups such as the 6-hydroxy alkyl fulvenes, 6-carboxy alkyl fulvenes and 6-aminoalkyl fulvenes, all of which are illustrated by specific compounds named above, is of especial value when it is desired to introduce reactive centers (in addition to the double bonds) in the interpolymer molecule.

Other variations in the nature of the fulvene are also contemplated by this invention, it being understood that the invention is generic to the copolymerization, with olefins polymerizable at low temperature by a Friedel-Crafts type catalyst, of any one or more compounds of the generic class of fulvenes.

Isobutene (or isobutylene as it is commonly called) is the olefin ordinarily and preferably used in this invention for interpolymerization with the fulvenes but other aliphatic isoolefins containing but one double bond such as 2-methyl-butene-1; 2-ethyl-butene-1; 3-methyl-butene-1; etc. are substantially equivalent to isobutene in the interpolymerization described herein and may be substituted therefor in whole or in part. Other olefins polymerizable at low temperatures in the presence of Friedel-Crafts type catalysts to yield solid products may also be copolymerized with fulvenes in accordance with this invention. Styrene, alpha methyl styrene, nuclear substituted methyl and dimethyl styrenes and the like are examples of olefins of this type and may be used as replacements in whole or in part for isobutylene. Generally it is desirable that the olefin contain from 4 to 10 carbon atoms.

In addition to the olefin, which is preferably present in major proportion more preferably in the range of 80 to 99.5% by weight, and the fulvene which is preferably present in minor proportion more preferably in the range of 0.5 to 20% by weight, the monomeric mixture to be polymerized to produce the interpolymers of this invention may also contain, if desired but not essentially, minor proportions, preferably in the range of 1 to 30% by weight of one or more other polyolefins copolymerizable with the olefin by the low-temperature Friedel-Crafts catalyst method including acyclic conjugated diolefins as butadiene-1,3, isoprene, 2,3-dimethyl butadiene-1,3, piperylene, hexadiene-2,4 and the like; alicyclic non-conjugated diolefins such as dimethallyl; alicyclic diolefins, both conjugated and non-conjugated such as cyclopentadiene, dicyclopentadiene, 1-vinyl cyclohexene-3, 1-vinyl cyclohexane-1, and the like; acyclic triolefins such as myrcene as well as other polyolefins containing preferably a total of 4 to 10 carbon atoms. When using mixtures containing olefin, fulvene and polyolefin, it is preferred, for the production of most desirable rubbery interpolymers, to employ mixtures containing 85 to 98.5% of an isoolefin, preferably isobutylene, 1 to 14.5% of a diolefin preferably an acyclic conjugated diolefin such as isoprene or butadiene-1,3 and from 0.5 to 5% of a fulvene preferably dimethyl fulvene.

In the preferred procedure for producing the interpolymers of this invention the mixture of monomeric materials is brought to the desired low reaction temperature, which is usually below room temperature (i. e. 25° C.) and ordinarily between —10° C. and —160° C., and more preferably between —75 and —125° C., by any suitable means such as the addition of internal refrigerants such as solid carbon dioxide (Dry Ice) or by the addition of low-freezing inert diluents or solvents such as liquid methane, liquid ethane, liquid ethylene, liquid propane, liquid butane, liquid methyl or ethyl chlorides, methylene chloride, dichlor-fluoro-methane, carbon disulfide or by addition of any mixture of such materials or by immersing the reaction vessel in a bath of a suitable refrigerant such as liquid vinyl chloride, liquid ammonia, liquid methane, liquid ethane, liquid ethylene or the like.

After cooling to reaction temperature the monomeric mixture is brought into contact with the Friedel-Crafts type polymerization catalyst while maintaining the temperature within the desired range. The preferred catalyst consists of a Friedel-Crafts type active metal halide catalyst particularly aluminum chloride dissolved in an inert solvent which is liquid at reaction temperature. Boron trifluoride is another preferred catalyst which may be used in the form of vapors or in solution in appropriate solvent materials. Preferred solvents are methyl chloride, ethyl chloride, carbon disulfide and the like. Other Friedel-Crafts type catalysts, not necessarily in solution may also be used.

The catalyst is applied to the monomeric mixture in any desired manner, for example, by spraying a solution of the catalyst in the form of a fine mist onto the surface of the reaction mixture either continuously or in a single operation, and efficiently mixing the monomer mixture and catalyst solutions. Still another technique of effecting intermingling of the monomer and catalyst solutions comprises conducting separate streams of monomer and catalyst solutions, by means of concentric pipes to the inlet of a centrifugal pump wherein quick and efficient intermingling of the solutions are effected after which the mixture is conducted to a separate container where the reactants can be agitated until further treatment.

When the monomer mixture and the catalyst are efficiently intermingled at reaction temperatures, the polymerization reaction takes place very rapidly and smoothly to produce in most cases a slurry of fine polymer crumbs suspended in the inert diluent. Generally, the reaction requires only a few minutes' time to reach completion and need not be terminated before completion. It is desirable, however, to destroy the catalyst residues in the reaction mixture to render the reaction mixture inocuous in subsequent handling steps. To this end, the reaction mixture is preferably quenched by admixing therewith a substantial quantity of a material which destroys the catalytic effect of the catalyst. The material may be water, ordinary 95% ethyl alcohol, ethylene glycol monoethyl ether, acetone, or various other alcohols, ethers, esters and ketones. After the reaction has proceeded to the desired point and the catalyst has been quenched, it is usually convenient to protect the polymer from oxidation or subsequent deterioration by adding an antioxidant thereto, a preferred procedure being to add a solution or dispersion of an antioxidant such as phenyl beta-naphthylamine or the like to the quenched reaction mixture. A further procedure to effect termination of the polymerization reaction is to first effect a physical separation of the polymer from the liquid components of the reaction mixture and disperse the separated polymer in a large quantity of quenching agent. In batch-wise reactions partial, if not complete, termination of the polymerization reaction can be effected (when the catalyst is being added gradually over a period of time) by cessation of catalyst addition when the reaction has progressed to the desired point or by raising the temperature, or by any combination of the above-mentioned expedients followed, preferably, by treatment with catalyst quenching agent.

After completion of the reaction and quenching of the catalyst the reaction mixture is treated to isolate the polymeric product. When the product is a solid rubbery polymer in crumb form, as is the usual case, the polymer need only be screened to effect a separation from the liquid content of the mixture. The solid rubbery product is then dried and after drying may be compacted into a sheet by passing the crumbs through a smooth roll rubber mill. The solid sheets of rubbery polymer are then ready for use in the manner customary in the rubber industry.

The interpolymerization reaction between the isoolefin and the fulvene is so rapid that the polymerization process may be carried out batchwise or it may be made continuous with recycling of recovered monomers and/or inert diluents and internal refrigerants, as will readily be apparent to those skilled in the art.

The following specific examples illustrate preferred embodiments of the invention in more detail. They illustrate the preparation of preferred interpolymers and demonstrate their advantageous properties. They are not, however, to be considered as limiting the invention to the details therein set forth since numerous variations and modifications in procedure and materials, in accordance with the foregoing general disclosure, will be apparent to those skilled in the art.

EXAMPLES 1 TO 4

In these examples monomer solutions containing mixtures of isobutene and 6,6-dimethyl fulvene dissolved in ethyl chloride are prepared and mixed with a catalyst solution comprising aluminum chloride dissolved in ethyl chloride. In preparing each monomer solution, there is added 200 cc. of isobutene to 600 cc. of cooled ethyl chloride contained in a reaction vessel. External cooling, such as liquid vinyl chloride, or internal coolant such as solid carbon dioxide (Dry Ice) is employed to bring the vessel and its contents down to the desired low reaction temperature. The correct amount of dimethyl fulvene is then added.

The catalyst solution is prepared by first mixing anhydrous ethyl chloride and aluminum chloride at a low temperature (below 0° C.) at which point the aluminum chloride is sparingly soluble. The mixture is then allowed to warm to room temperature at which temperature the aluminum chloride dissolves in the ethyl chloride. The catalyst solution is then cooled to reaction temperature without crystallization or separation of aluminum chloride, for aluminum chloride seems to form a stable supersaturated solution when so prepared.

The catalyst and monomer solutions are then mixed either by adding small portions of the catalyst solution to the reaction vessel while vigorously agitating the monomeric solution or more preferably by applying the catalyst solution in a continuous manner to the surface of the monomer solution in the form of a fine spray, all the while vigorously agitating the monomer solution to prevent the formation of high concentrations of catalyst in the surface layers. Interpolymerization of the monomers occurs almost instantly to form a solid rubbery interpolymer which separates from the reaction liquor in the form of fine crumbs or flakes. When all the catalyst solution is added, the agitation of the contents of the reaction vessel is continued for a short time to allow completion of the reaction. The reaction mixture is then treated with several volumes of 95% ethyl alcohol to quench the catalyst and allowed to warm to room temperature. At room temperature the ethyl chloride and unreacted isobutene are volatilized. The alcohol is then removed by distillation. After removal of the alcohol any unreacted dimethyl fulvene (substantially all of the dimethyl fulvene polymerizes) is removed by steam distillation and the solid rubbery copolymer is then washed and dried.

Table I, below, presents the pertinent data of Examples 1 to 4, including percent by volume of isobutene (I-Bu) and dimethyl fulvene (DMF) in the monomeric mixture, the concentration (percent by weight) of aluminum chloride in the ethyl chloride of the catalyst solution, the temperature of reaction, the unsaturation of the polymer as evidenced by the iodine value (I. V.) determined by the Wijs method, percent of the polymer insoluble in diisobutylene molecular weight (Mv) of the soluble portion as determined by the solution method of Staudinger, and remarks about the general nature of the copolymer.

*Table I*

| Example | Percent I-Bu | Percent DMF | AlCl₃, Percent | Reaction Temp., °C. | Mv×10⁻³ | I. V. | Percent Insol. by wt. | Remarks |
|---|---|---|---|---|---|---|---|---|
| 1 | 98.0 | 2.0 | 1.2 | −124 | 970 | 3.2 | 55 | Tough polymer, Readily vulcanizable. |
| 2 | 96.5 | 3.5 | 1.2 | −113 | 630 | 5.3 | 39 | Softer than 1. Readily vulcanizable. |
| 3 | 96.0 | 4.0 | 1.2 | −100±5 | 690 | 4.6 | 45 | Solid rubber polymer. Readily vulcanizable |
| 4 | 95.0 | 5.0 | 1.2 | −100±5 | 670 | 7.3 | 72 | Similar to 3. |

Polymers similar to those described in Table I except for higher I. V. values are obtained using monomeric mixtures containing up to and including 10% by volume or by weight of 6,6-dimethyl fulvene and satisfactory solid rubbery polymers can be prepared, though of lower molecular weight, with mixtures containing from 10 to 30% by volume or by weight of 6,6-dimethyl fulvene.

It will be noted from Table I that the unsaturation value represented by I. V. for the interpolymers of Examples 1 to 4 is greater than the unsaturation represented by the percent fulvene in the monomeric mixture This is believed due to the fact that the introduction of one cyclopentadiene group into the polymer chain introduces two carbon to carbon double bonds and to the fact that the fulvene compound enters substantially 100% into the polymerization reaction. This is in contrast with the polymerization reaction between isobutene and the diolefins such as butadiene-1,3 or isoprene, where the butadiene or isoprene content of the copolymer is always considerably lower than the butadiene or isoprene content of the monomeric mixture. This comparatively higher unsaturation value characteristic of the isobutene fulvene interpolymers is advantageous: (1) because it results in an efficient use of fulvene (which is considerably more expensive than isobutene); (2) because it results in greater control over the vulcanization or curing characteristics of the final polymer; and (3) because it results in polymers of relatively higher I. V. and consequently in cured polymers of higher modulus (as the I. V. increases the 300% modulus of the vulcanized interpolymer increases).

It will also be noted from Table I that the interpolymers of Examples 1 to 4 contain appreciable amounts of insoluble material or "gel." This is also in marked contrast to isobutylene isoprene copolymers such as "Butyl" rubber and "GR–I" since these are completely soluble in diisobutylene. This difference in "gel" manifests itself in raw polymer properties and processability. The isoolefin fulvene interpolymers are partially insoluble and have been found to be easily processable, that is, they are more easily broken down to a smooth band on a rubber mill and in that "broken down" condition will more readily accept carbon black, clays, powdery age resistors, sulfur and other compounding ingredients than "Butyl" rubber or "GR–I." This increased processability is achieved with no concomitant decrease in raw polymer properties, but to the contrary is achieved with more than a seven-fold increase in raw polymer strength. Moreover, since the interpolymers of Examples 1 to 4 are easily cured by sulfur in the presence of conventional rubber vulcanization accelerators to produce strong elastic vulcanizates, the improvement in processability is not achieved at the expense of the properties of the final vulcanized compositions.

EXAMPLES 5 TO 10

The preceding examples were concerned with the production of two-component interpolymers or dipolymers. However, as hereinabove mentioned, the fulvenes of the class disclosed are also advantageously used to form tripolymers, tetrapolymers and other multi-polymers (that is, interpolymers made from three-, four- and other multi-component monomeric mixtures). Examples 5 to 10 demonstrate the preparation and properties of various tripolymers from monomeric mixtures containing, as two monomeric components, an isoolefin such as isobutene and a fulvene.

The interpolymers of these examples are made in a glass-lined reactor by the procedure employed in the preparation of the dipolymers of Examples 1 to 4. The final polymers obtained and an isobutene isoprene copolymer known as "GR–I" are milled on a laboratory rubber mill until a smooth band is formed and the banding operation continued for 2 or 3 minutes. Compounding ingredients are added to the banded material according to the following recipe, in which parts are by weight:

| Material: | Parts |
|---|---|
| Polymer | 100.0 |
| Zinc oxide | 5.0 |
| Stearic acid | 3.0 |
| Mercaptobenzothiazole | 0.5 |
| Tetramethyl thiuram disulfide | 1.0 |
| Sulfur | 2.0 |
| Channel Black (E. P. C.) | 50.0 |

The compounded polymer compositions are split into four portions and then heated in a molding press for 20, 40, 60 and 120 minutes at 307° F. and the various samples tested for tensile strength, elongation and 300% modulus. Table 2, below, presents pertinent data relating to the various tripolymers and the control. The table shows the composition of the monomeric mixture, in percent volume, of isobutene (I-Bu), 6,6-dimethyl fulvene (DMF), and isoprene (I), the catalyst and its concentration (in ethyl chloride); the reaction temperature (T.=° C.); the molecular weight of the polymer (Mv); the unsaturation or iodine value (I. V.) as determined by the Wijs method; the Mooney viscosity of the raw polymer as determined with the Mooney viscosimeter using the large rotor after 4 minutes at 212° (MLR–4–212); the time of vulcanization in minutes; the tensile strength exhibited at 300% elongation (300% modulus) in lbs./sq. in.; the tensile strength at break in lbs./sq. in.; the elongation at break in percent; the plasticity extrusion (amount of polymer in cc. per minute extruded through a standard orifice under a standard pressure at 212° F. of the raw polymer); and general remarks about the processability of the raw polymer.

In addition, the fulvene interpolymers are broken down on a rubber mill to form smooth bands of plastic material much more easily than the GR–I control, even though their Mooney viscosities are generally higher. It will also be noted that the "plasticity extrusion" of the interpolymers of these examples is from 1/19 to 1/3 that of the GR–I control. The plasticity extrusion is an indication of the tendency of the polymer to suffer cold flow or "growth" (the greater the plasticity extrusion the greater the tendency for the polymer to flow). Thus, the fulvene interpolymers have better raw polymer strength than conventional "Butyl" rubbers yet are not tough or "nervy" in the sense that they are difficult to process. The improvement in raw polymer properties makes the polymer easy to handle, store and ship in the unvulcanized condition. The improvements, however, in raw polymer properties and in processability are clearly demonstrated to have been achieved without sacrifice in the properties of the cured or vulcanized compositions. In the latter connection, attention is particularly directed to the superior modulus and strength shown by the interpolymers of these examples.

*Table II*

| Example No. | Composition of Monomers, Vol. Per Cent | Catalyst Conc., Per Cent | T., °C. | Mv×10⁻³ | I. V. | MLR-4-212° F. | Time of Cure, Min. | Cure at 307° F. | | | Plasticity Extrusion, cc./in. | Remarks |
|---|---|---|---|---|---|---|---|---|---|---|---|---|
| | | | | | | | | 300% Modulus, lbs./sq. in. | Tensile Strength, lbs./sq. in. | Elongation, Per Cent | | |
| 5 | I-Bu=96.75, I=2.50, DMF=0.75 | 1.2% AlCl₃ | −106 | 470 | 7.6 | 61 | 20<br>40<br>60<br>120 | 480<br>600<br>770<br>920 | 3,080<br>3,300<br>3,200<br>3,300 | 815<br>720<br>690<br>650 | 23.6 | Processing very good. Better than control. |
| 6 | I-Bu=97.0, I=2.0, DMF=1.0 | 1.2% AlCl₃ | −100 ±5 | 570 | 7.3 | 80 | 20<br>40<br>60<br>120 | 450<br>520<br>590<br>690 | 2,750<br>2,900<br>2,900<br>3,240 | 770<br>740<br>740<br>720 | 26.8 | Polymer 4% insoluble— More easily processable than control. |
| 7 | I-Bu=96.0, I=2.5, DMF=1.5 | 0.25% | −100 ±5 | 750 | 8.0 | 80 | 20<br>40<br>60<br>120 | 500<br>720<br>860<br>1110 | 3,400<br>3,770<br>3,780<br>3,500 | 885<br>845<br>820<br>735 | -------- | More easily processable than control. |
| 8 | I-Bu=93.8, I=5.0, DMF=1.5 | 1.2% AlCl₃ | −100 ±5 | 350 | 11.8 | 42 | 20<br>40<br>60<br>120 | 1000<br>1300<br>1390<br>1400 | 2,460<br>2,620<br>2,400<br>2,590 | 600<br>520<br>552<br>500 | 4.8 | Do. |
| 9 | I-Bu=92, I=6, DMF=2 | 1.2% AlCl₃ | −100 | 380 | 11.1 | 47 | 20<br>40<br>60<br>120 | 1190<br>1400<br>1550<br>1640 | 2,400<br>2,590<br>2,300<br>2,450 | 527<br>482<br>420<br>410 | 4.3 | Do. |
| 10 | I-Bu=91.0, I=6.0, DMF=3.0 | 1.2% AlCl₃ | −100 | 450 | 11.7 | 60 | 20<br>40<br>60<br>120 | 1080<br>1650<br>1950<br>1850 | 2,510<br>2,600<br>2,600<br>2,700 | 547<br>435<br>390<br>422 | 11.0 | Do. |
| | GR-I Control (Isobutylene-isoprene copol.) | | | 337 | 7.3 | 46.0 | 20<br>40<br>60<br>120 | 400<br>530<br>580<br>680 | 2,180<br>2,460<br>2,470<br>2,530 | 820<br>750<br>745<br>700 | 76.0 | -------- |

From Table II it is readily apparent that the vulcanized fulvene interpolymers possess significantly higher modulus at 300% elongation than the conventional "GR–I" isobutene-isoprene dipolymers, that is, the vulcanized fulvene interpolymers are more elastic in nature and hence give evidence of a "tighter" cure. They have tensile strengths generally greater than the conventional "GR–I" control. Their tear resistance is also generally higher; for example the crescent tear resistance of the polymer of Example 5 is 35.9 lbs./in. as compared to 26.0 lbs./in. for the "GR–I" control.

EXAMPLES 11 TO 22

These examples demonstrate the use of still other monomer mixtures in the preparation of interpolymers according to this invention. The procedure used in each example is that of Examples 1 to 5 and the catalyst used is a 1.2% solution of aluminum chloride in ethyl chloride. Each example results in the preparation of a solid plastic rubbery interpolymer of molecular weight above 250,000 which is easily processable and vulcanizable to elastic rubbery products. The composition of the monomer mixtures, the temperature of polymerization, and the molecular weight (Mv) of the polymer are shown in Table III.

*Table III*

| Example | Monomer Mixture (percent by volume) | Temp. of Polym. | $Mv \times 10^{-3}$ of Polym. |
|---|---|---|---|
| 11 | Isobutene, 96%<br>6-methyl 6-phenyl fulvene, 4% | $-102\pm5°$ C. | 450 |
| 12 | Isobutene, 96%<br>6-methyl 6-isopropenyl fulvene, 4% | $-109\pm3°$ C. | 530 |
| 13 | Isobutene, 96%<br>6-methyl 6-ethyl fulvene, 4% | $-105\pm5°$ C. | 640 |
| 14 | Isobutene, 97%<br>6-methyl 6-isopropyl fulvene, 3% | $-105\pm5°$ C. | 415 |
| 15 | Isobutene, 96%<br>6-ethyl fulvene, 4% | $-105\pm5°$ C. | 420 |
| 16 | Isobutene, 96%<br>6-phenyl fulvene, 4% | $-105\pm5°$ C. | 660 |
| 17 | Isobutene, 98%<br>6-methyl 6-vinyl fulvene, 2% | $-105\pm5°$ C. | 596 |
| 18 | Isobutene, 96%<br>6,6-dimethyl fulvene, 2%<br>1-vinyl cyclohexene-1, 2% | $-100\pm5°$ C. | 263 |
| 19 | Isobutene, 86%<br>6,6-dimethyl fulvene, 4%<br>Butadiene-1,3, 10% | $-100\pm5°$ C. | 202 |
| 20 | Isobutene, 97%<br>6,6-dimethyl fulvene, 1%<br>Cyclopentadiene, 2% | $-100\pm5°$ C. | 410 |
| 21 | Isobutene, 94%<br>6,6-dimethyl fulvene, 1%<br>1-vinyl-cyclohexene-3, 2%<br>Dicyclopentadiene, 3% | $-100\pm5°$ C. | 280 |
| 22 | Isobutene, 94%<br>6-methyl-6-[2-methyl 2-hydroxypropyl] fulvene, 4%. | $-100\pm5°$ C. | 7,250 |

EXAMPLE 23

The above examples have all employed an iso-olefin such as isobutene as one component of the monomer mixture polymerized. However, as indicated hereinabove, other olefins polymerizable at low temperatures in the presence of a Friedel-Crafts type catalyst may also advantageously be interpolymerized with fulvenes. To illustrate, in this example 0.5 mole of styrene and 0.1 mole of dimethyl fulvene are mixed and polymerized by the procedure of the above examples at 10° C. using a 1.2% solution of aluminum chloride in ethyl chloride as the catalyst. A 99% yield of a solid high molecular weight thermoplastic resinous material having an iodine value of 31.7 is obtained. Because of the high iodine value the resin is vulcanizable to reduce its thermoplasticity and produce a harder resinous material.

The foregoing examples have disclosed the use of ethyl chloride as a diluent and as the solvent in the catalyst solutions. The fulvene interpolymers of this invention may be made, however, with variations in the diluent used or may be made without diluent. Ethyl chloride is the preferred diluent because the resultant slurry of polymer is more easily handled in the recovery operations and its use appears to favor the formation of polymers having slightly higher molecular weight. Methyl chloride, however, may be substituted for ethyl chloride without any significant difference in the polymerization and it may be preferable to use methyl chloride when operating with extremely low reaction temperatures of $-125$ to $-150°$ C. Other diluents such as liquid methane, liquid ethane, liquid propane, liquid butane, liquid ethylene, and others may be substituted for the ethyl chloride shown in the examples, either in whole or in part with good results though the rubbery copolymer may not separate from a predominantly hydrocarbon reaction medium as readily as from a reaction medium containing the chlorohydrocarbons.

Anhydrous aluminum chloride used in the examples above is the preferred Friedel-Crafts catalyst. The amount of this material or other Friedel-Crafts catalyst is not critical and the yield and molecular weight of the resultant polymer appears to be largely independent of the amount and concentration of catalyst. The only real limitation on the amount and concentration of catalyst is a mechanical difficulty encountered when using large amounts of a concentrated catalyst solution whereby difficulty is incurred in efficiently distributing such catalyst before rapid polymerization occurs in localized areas with the formation of unwieldy lumps of polymer and consequent local overheating. It has been found that 1 part of aluminum chloride dissolved in sufficient ethyl or methyl chloride to provide a solution containing from 0.01 to 2.0% by weight of aluminum chloride will cause the formation of from 100 to 600 parts of polymer without an induction period and with complete conversion of the monomeric mixture. When specially purified monomeric materials are used, less catalyst in the form of more dilute solutions may be used, the useful operating range being from 0.001 to 3% by weight of aluminum chloride based on the weight of monomers in sufficient ethyl or methyl chloride to yield a solution having a concentration of aluminum chloride of about 0.01 to 10% by weight. Boron trifluoride in amounts 0.10 to 3.0% based on the monomers in the form of solutions in ethyl or methyl chloride containing from 0.1 to 3% will also successfully bring about the polymerization of monomeric mixtures containing isobutene and fulvene compounds. Other Friedel-Crafts type catalysts which may be used include antimony chloride, iron chloride, tin chloride, and zinc chloride as well as the halides of aluminum, titanium, uranium, and zirconium, and complexes of any of these with inorganic polar compounds, such as sodium chloride or other alkali or alkaline earth metal halides, water, hydrogen halides and organic polar compounds such as the various nitro compounds, organic halides, ethers, esters, ketones, and sulfones.

The proportion of the fulvene used in forming the interpolymers of this invention may be varied widely depending on the nature of polymer desired. Examples 1 to 22 described hereinabove are directed to the production of high molecular weight solid plastic rubbery interpolymers of isobutene and a fulvene, which interpolymers contain a major proportion of combined isobutene and a minor proportion of combined fulvene, and are characterized by possessing a high molecular weight (generally above 200,000), by possessing low unsaturation (an iodine number below 50) and by being vulcanizable to a strong elastic condition. Such interpolymers are useful as synthetic rubbers in the same manner as "Butyl" rubber, being of particular value for inner tubes. Example 23 is directed to the production of a high molecular weight resinous thermoplastic interpolymer useful in the same manner as other thermoplastic resins, from a major proportion of another olefin, styrene, and a minor proportion of a fulvene. However, it is also within the contemplation of this invention to interpolymerize major proportions of a fulvene with minor proportions of an olefin, at low temperatures in the presence of a Friedel-Crafts type catalyst to produce useful interpolymers. Generally speaking interpolymers made from monomeric mixtures containing from 1 to 50% by weight of an olefin and 50 to 99% by weight of a fulvene when so polymerized produce polymers ranging in properties from clear solid resins to viscous semi-liquids depending on molecular weight, which is generally above 15,000. The viscous semi-liquid interpolymers are useful as additives to lubricating oils and are useful in preparing coatings, etc.

Thus, the interpolymerization of an olefin with a fulvene produces useful polymers regardless of proportions of the fulvene employed, and, consequently, this invention provides a whole new class of polymeric materials and a method of producing them. It is not intended therefore that the invention be limited except by the spirit and scope of the appended claims.

I claim:

1. A solid plastic, rubbery interpolymer of a monoisoolefin and a monomeric fulvene hydrocarbon containing from 6 to 18 carbon atoms including a single cyclopentadiene nucleus, said interpolymer being prepared by interpolymerization in the presence of a Friedel-Crafts catalyst at a temperature of from $-10$ to $-160°$ C.

2. A solid plastic, rubbery interpolymer prepared by the polymerization in the presence of a Friedel-Crafts catalyst at a temperature of $-10$ to $-160°$ C. of a monomeric mixture comprising from 80 to 99.5% by weight of a monoisoolefin containing from 4 to 10 carbon atoms, and from 0.5 to 20% by weight of a monomeric fulvene hydrocarbon containing from 6 to 18 carbon atoms including a single cyclopentadiene nucleus, said interpolymer being characterized by a molecular weight in excess of 200,000, by a low unsaturation below an iodine number of 50, reactivity with sulfur, and by containing diisobutylene-insoluble gel so as to possess reduced plastic flow at ordinary temperatures and improved processability at elevated temperatures.

3. An interpolymer according to claim 2 wherein the monoisoolefin is isobutene.

4. An interpolymer according to claim 2 wherein the monoisoolefin is isobutene and the fulvene is 6,6-dimethyl fulvene.

5. A solid plastic, rubbery dual copolymer prepared by the polymerization in the presence of a Friedel-Crafts catalyst at a temperature of $-75$ to $-125°$ C. of a monomeric mixture consisting of from 80 to 99.5% by weight of isobutene and from 0.5 to 20% by weight of monomeric 6,6-dimethyl fulvene, said copolymer being characterized by a molecular weight in excess of 200,000, by a low unsaturation below an iodine number of 50, reactivity with sulfur, and by being partially insoluble in diisobutylene.

6. A solid plastic, rubbery tripolymer prepared by the polymerization in the presence of a Friedel-Crafts catalyst at a temperature of $-75$ to $-125°$ C. of a monomeric mixture consisting of from 85 to 98.5% by weight of isobutene, from 0.5 to 5% by weight of a monomeric fulvene hydrocarbon containing from 6 to 18 carbon atoms including a single cyclopentadiene nucleus, and from 1 to 14.5% by weight of isoprene, said tripolymer being characterized by a molecular weight in excess of 200,000, by a low unsaturation below an iodine number of 50, reactivity with sulfur, and by being at least partially insoluble in diisobutylene.

7. The process of producing a solid plastic and rubbery interpolymer comprising the step of polymerizing in the presence of a Friedel-Crafts catalyst at a temperature of $-10$ to $-160°$ C. a monomeric mixture comprising 80 to 99.5% by weight of a monoisoolefin containing from 4 to 10 carbon atoms and from 0.5 to 20% by weight of a monomeric fulvene hydrocarbon containing from 6 to 18 carbon atoms including a single cyclopentadiene nucleus.

8. The process of claim 7 in which the catalyst is a solution of aluminum chloride in ethyl chloride.

CHARLES I. PARRISH.

REFERENCES CITED

The following references are of record in the file of this patent:

UNITED STATES PATENTS

| Number | Name | Date |
|---|---|---|
| 2,356,128 | Thomas et al. | Aug. 22, 1944 |
| 2,431,461 | Calfee et al. | Nov. 25, 1947 |
| 2,512,698 | Thompson et al. | June 27, 1950 |
| 2,521,359 | Garber | Sept. 5, 1950 |